Feb. 10. 1925.
J. A. NELSON
VALVE MECHANISM
Filed April 8. 1924
1,525,462
2 Sheets-Sheet 1
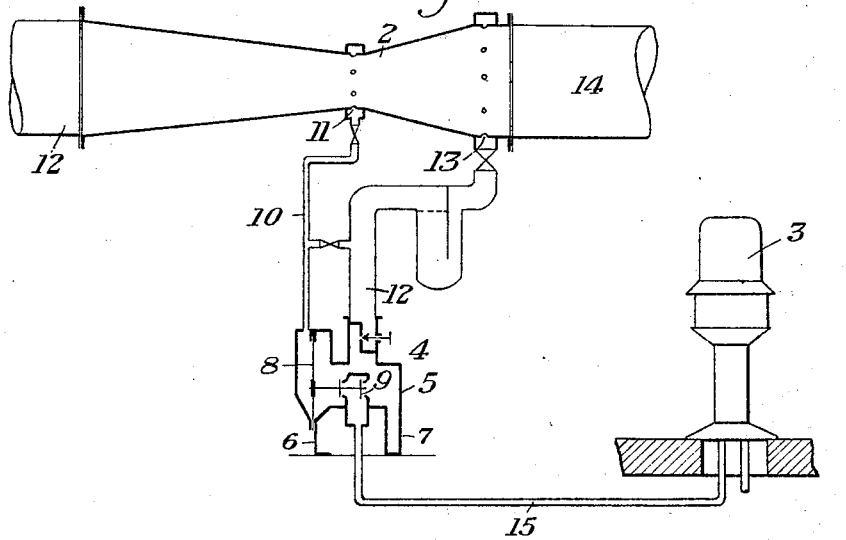
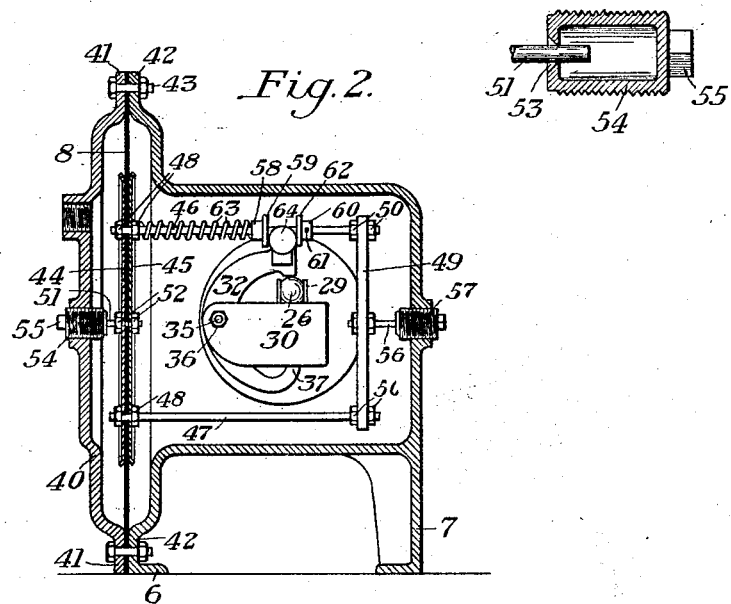
INVENTOR
John Albert Nelson
By Byrnes, Stebbins & Parmelee
His Attys Feb. 10, 1925.
J. A. NELSON
VALVE MECHANISM
Filed April 8, 1924   2 Sheets-Sheet 2
1,525,462
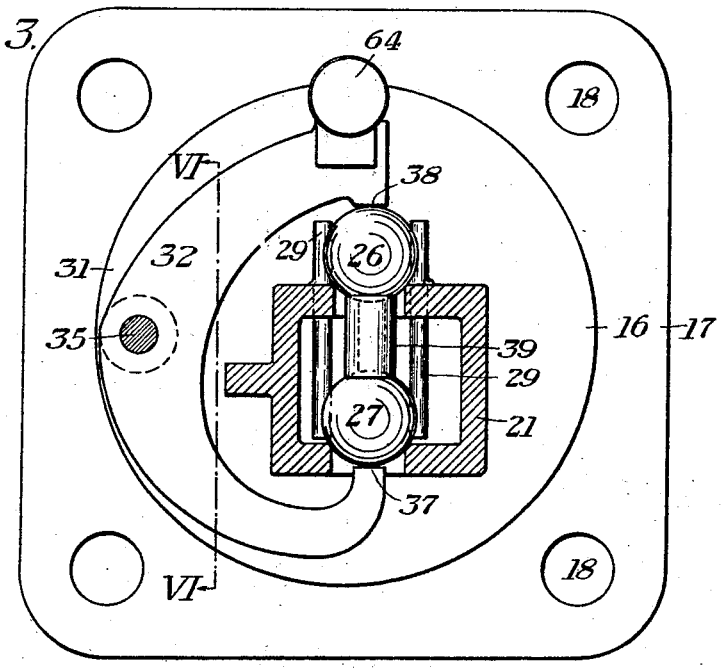
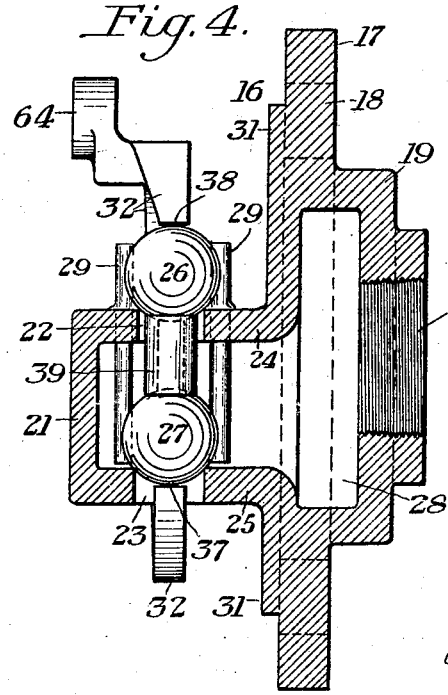
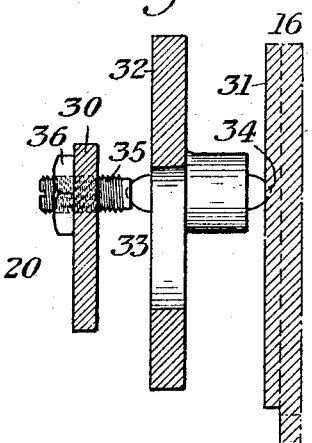
INVENTOR
John Albert Nelson Patented Feb. 10, 1925.

1,525,462

UNITED STATES PATENT OFFICE.

JOHN ALBERT NELSON, OF OIL CITY, PENNSYLVANIA, ASSIGNOR TO KEYSTONE MACHINE & ENGINEERING COMPANY, OF OIL CITY, PENNSYLVANIA, A CORPORATION OF PENNSYLVANIA.

VALVE MECHANISM.

Application filed April 8, 1924. Serial No. 704,956.

*To all whom it may concern:*

Be it known that I, JOHN ALBERT NELSON, a citizen of the United States, residing at Oil City, county of Venango, and State of Pennsylvania, have invented a new and useful Improvement in Valve Mechanism, of which the following is a full, clear, and exact description.

The present invention relates broadly to valve mechanism, and more particularly to diaphragm-controlled valve mechanism for use in connection with fluid meters for controlling the flow of fluid thereto.

The purpose of the invention is to provide a valve mechanism embodying a perfectly balanced valve which is highly sensitive to variations of the pressures on opposite sides of the diaphragm with no tendency of the valve to stick in the closed position thereof.

A preferred embodiment of my invention is shown in the accompanying drawings, in which—

Figure 1 is a diagrammatic view illustrating the manner in which the valve mechanism is associated with a meter for measuring the flow of a liquid through a venturi;

Figure 2 is a sectional view through the valve mechanism;

Figure 3 is a view, partly in elevation and partly in section, of the balanced valve;

Figure 4 is a section of the balanced valve, taken at right angles to the view of Figure 3;

Figure 5 is a detail view; and

Figure 6 is a section on line VI—VI of Figure 3.

Referring first to Figure 1, 2 indicates a venturi and 3 a meter for measuring the flow of water or other fluid through the venturi. Interposed between the meter and venturi is valve mechanism 4 embodying my invention. This mechanism comprises a housing 5 having supporting legs 6 and 7. The housing has a diaphragm 8 held therein which is operatively connected to the valve 9. Fluid enters the housing on the left-hand side of the diaphragm through a pipe 10 leading from the portion 11 of the venturi of smallest diameter, while fluid enters the housing on the right-hand side of the diaphragm through a larger pipe 12 leading from a portion 13 of the venturi having a diameter corresponding to that of the main supply pipe 14. It will be apparent that, when water is flowing through the venturi, the pressure at 13 will be greater than at 11, so that there will be a greater pressure on the right-hand side of the diaphragm than on the left-hand side thereof. Consequently, this difference in the pressures will cause the opening of the valve 9, through the operative connection between the valve and diaphragm, and water will flow past the valve and through the pipe 15 to the meter.

The valve comprises a valve casing 16 having a flange 17 provided with openings 18 whereby the casing is bolted inside the housing 5. The valve casing has a portion 19 offset from the flange 17 and adapted to extend through a suitable opening in a side wall of the housing 5, the flange 17 being bolted to such side wall with a suitable packing interposed between the flange and side wall. The offset portion 19 of the valve casing has a threaded opening 20 through the same into which one end of the pipe 15 leading to the meter is tapped. The valve casing has a portion 21 offset from the opposite side of the flange 17 which has circular openings 22 and 23 in the upper and lower horizontal walls 24 and 25 thereof. These circular openings are of exactly the same diameter. Co-operating with these openings are spherical valve members 26 and 27, also of exactly the same diameter. The valve member 26 is positioned above the upper wall 24 and is seated in the opening 22, the upper circular edge of such opening forming the valve seat for such valve member. On the other hand, the valve member 27 is positioned within the valve chamber 28 and is seated in the opening 23, the circular upper edge of said opening forming the seat for such valve member. Surrounding the valve members 26 and 27 is a plurality of pins 29 which are threaded through the upper wall 24 and constitute a cage for the valve members.

The offset portion 21 of the valve casing has a flange 30 projecting therefrom parallel to the wall 31 of the valve casing. A curved valve lever 32 is pivoted between the flange 30 and the wall 31. The pivotal connection for the lever is formed by means of a pin 33 fitted in an intermediate portion of the lever and having pointed ends, one of which engages in a depression 34 in the wall 31, and the other of which engages in the recessed end of a set screw 35 tapped through the flange 30 and held in adjusted position by means of a lock nut 36.

One end 37 of the valve lever 32 is adapted to engage the lower side of the valve member 27 and the other end 38 of the valve lever is adapted to engage the upper side of the valve member 26. Interposed between the valve members 26 and 27 is a spacer 39 in the form of a sleeve, the length of which is such that, when the valve members are resting upon their seats, the spacer engages both members without any play between the spacer and the valve members. This distance between the end edges 37 and 38 of the valve lever is also approximately equal to the distance between the lowest point on the surface of the valve member 27 and the highest point on the valve member 26 when these valve members are resting upon their seats. In the position of the parts as shown in Figure 3, both valve members are resting upon their seats, and it will be apparent that, if the valve lever 32 is rocked in a counter-clockwise direction, both valve members will be raised an equal amount away from their seats.

The operative connection between the diaphragm 8 and the valve lever is shown in Figure 2. The housing has a removable side 40 and the diaphragm is clamped between the flange 41 of such side and a flange 42 on the housing by means of bolts 43. Metallic protecting plates 44 and 45 are positioned on opposite sides of the diaphragm and parallel rods 46 and 47 have one end thereof projecting through these plates and the diaphragm, nuts 48 being mounted upon such end of each rod on opposite sides of the diaphragm and plates, whereby the plates are clamped to the diaphragm and the rods are supported by the plates. Rods 46 and 47 are connected at their opposite ends by a cross bar 49 through which the end of each rod extends. Nuts 50 are mounted on the rods on opposite sides of the cross bar, whereby the latter is held in position on the rods. A stem 51 extends through the central portion of the plates 44 and 45 and through the diaphragm and is secured to the plates by nuts 52 mounted on the stem on opposite sides of the diaphragm. This stem projects through an opening 53 in a hollow plug 54 (shown in detail in Figure 5) which is exteriorly threaded and tapped into the removable wall 40 of the housing 5. This plug has a wrench engaging projection 55 at the end opposite the opening 53. The edge of the opening 53 is beveled so as to provide a knife edge for engagement with the stem 51 to thereby reduce friction between the stem and edge of the opening. The cross bar 49 has a stem 56, corresponding to the stem 51, mounted thereon and this stem projects into an opening in a hollow plug 57 similar to the plug 54, the plug 57 being tapped into a wall of the housing 5. It will be seen that the plates 44 and 45, rods 46 and 47 and cross bar 49 constitute a frame which is supported for reciprocation by means of the stems 51 and 56 projecting into the plugs 54 and 57. The rod 46 has a sleeve 58 slidably mounted thereon and having a flange 59 at one end thereof. The rod also has a similar sleeve 60 fixed thereon by means of a set screw 61, said sleeve having a flange 62 corresponding to the flange 59 at one end thereof. A coil spring 63 is interposed between the sleeve 58 and the nut 48 on rod 46 and tends to urge the sleeve 58 toward the fixed sleeve 60. The upper end of the valve lever 32 has a circular lug 64 projecting therefrom and positioned between the flanges 59 and 62 on the sleeves 58 and 60. It will be seen that motion of the diaphragm 8 imparted thereto by reason of differences in pressures on the opposite sides thereof will be imparted to the lever 32, tending to rock the same in one direction or the other, and thereby effecting the seating or unseating of the valve members 26 and 27.

Since the openings 22 and 23, the upper edges of which constitute the seats for the valve members 26 and 27, are of exactly the same diameter, the pressure of the fluid on the lower valve member 27 tending to open the valve is exactly balanced by the pressure on the upper valve member 26 tending to maintain the valve closed. Furthermore, the fluid passing through the valve maintains the spherical valve members 26 and 27 in constant motion, revolving these valve members upon the ends of the spacer 39, the valve members whirling first about one axis and then about another, so that there is absolutely no tendency to wear the valve members unevenly. As a matter of fact, there is no tendency to wear the valve members at all by reason of the fact that the entire surface of each valve member is constantly lubricated by the fluid passing through the valve. The construction is such, therefore, that there is no tendency of the valve members to stick when seated, so that the slightest difference in pressures on the opposite sides of the diaphragm is effective to open the valve.

While I have shown and described a preferred embodiment of my invention, it will be understood that changes may be made in the details of construction shown without departing from the spirit of the invention or scope of the appended claims.

I claim:

1. Valve mechanism, comprising a diaphragm and a valve controlled thereby, said valve comprising a valve chamber having an outlet opening and a pair of axially alined circular inlet openings in the walls thereof, a spherical valve member co-operating with each of said inlet openings, a spacer interposed between said valve members and engaging each of them when seated in said inlet openings, and a pivoted valve-operating lever operatively connected to said diaphragm for actuation thereby and having end surfaces arranged for engagement with said valve members, the latter being arranged between said end surfaces, substantially as described.

2. Valve mechanism, comprising a diaphragm and a valve controlled thereby, said valve comprising a valve chamber having an outlet opening and a pair of axially alined circular inlet openings of the same diameter in the walls thereof, spherical valve members of the same diameter arranged to seat in said inlet openings on corresponding sides thereof, a spacer interposed between said valve members and engaging each of them when seated in said inlet openings, and a pivoted valve-operating lever operatively connected to said diaphragm for actuation thereby and having end surfaces arranged for engagement with said valve members, the latter being arranged between said end surfaces, substantially as described.

3. Valve mechanism, comprising a diaphragm and a valve controlled thereby, said valve comprising a valve chamber having an outlet opening and a pair of vertically spaced axially alined circular inlet openings of the same diameter in the walls thereof, spherical valve members of the same diameter arranged to seat upon the upper circular edges of said inlet openings, a spacer interposed between said valve members and engaging each of them when seated in said inlet openings, said spacer having recessed ends providing seats for said valve members, and a pivoted valve-operating lever operatively connected to said diaphragm for actuation thereby and having end surfaces arranged for engagement with said valve members, the latter being arranged between said end surfaces, substantially as described.

4. Valve mechanism, comprising a housing having a diaphragm dividing the interior thereof into two compartments, a valve chamber in one of said compartments having an outlet opening and a pair of vertically spaced axially alined inlet openings of the same diameter in the walls thereof, spherical valve members of the same diameter arranged to seat upon the upper circular edges of said inlet openings, a spacer interposed between said valve members and engaging each of them when seated in said inlet openings, a pivoted valve-operating lever having end surfaces arranged for engagement with said valve members, the latter being arranged between said end surfaces, means operatively connecting said diaphragm with said lever whereby the latter is actuated by said diaphragm, a pin projecting from each end of said connecting means, and means carried by said housing for slidably supporting said pins, substantially as described.

5. Valve mechanism, comprising a housing having a diaphragm dividing the interior thereof into two compartments, a valve chamber in one of said compartments having an outlet opening and a pair of vertically spaced axially alined inlet openings of the same diameter in the walls thereof, spherical valve members of the same diameter arranged to seat upon the upper circular edges of said inlet openings, a spacer interposed between said valve members and engaging each of them when seated in said inlet openings, a pivoted valve-operating lever having end surfaces arranged for engagement with said valve members, the latter being arranged between said end surfaces, means operatively connecting said diaphragm with said lever whereby the latter is actuated by said diaphragm, a pin projecting from each end of said connecting means, and hollow plugs mounted in the walls of said housing and affording knife-edge sliding supports for said pins, substantially as described.

6. A valve, comprising a valve casing having an outlet opening and a pair of axially alined circular inlet openings of the same diameter in the walls thereof, a pair of spherical valve members of the same diameter arranged to seat in said inlet openings upon corresponding sides thereof, means for guiding the movements of said valve members toward and from their seats, a spacer interposed between said valve members and engaging each of them when seated in said inlet openings, and a pivoted valve-operating lever having end surfaces arranged for engagement with said valve members, the latter being positioned between said end surfaces, substantially as described.

7. A valve, comprising a valve casing having parallel upper and lower walls provided with axially alined circular inlet openings of the same diameter therein, a pair of spherical valve members of the same diameter arranged to seat upon the upper circular edges of said inlet openings, a plurality of pins extending through the upper of said parallel walls and surrounding said valve members to form a cage therefor, a tubular spacer interposed between said valve members and engaging each of them when seated in said inlet openings, and a valve-operating lever pivoted to said casing and having end surfaces arranged for engagement with said valve members, the latter being positioned between said end surfaces, substantially as described.

In testimony whereof I have hereunto set my hand.

JOHN ALBERT NELSON.